United States Patent [19]

Ozawa et al.

[11] Patent Number: 4,707,430
[45] Date of Patent: Nov. 17, 1987

[54] OPTICAL RECORDING MEDIUM

[76] Inventors: Hiroshi Ozawa, 22-8, Numame 3-chome, Isehara, Kanagawa-ken; Yoichi Hosono, 2070, Iijima-cho, Totsuka-ku, Yokohama, Kanagawa-ken; Sumio Hirose, 1272-97, Kuda-cho, Totsuka-ku, Yokohama, Kanagawa-ken; Katsuyoshi Sasagawa, 1510, Shinyoshida-cho, Kohoku-ku, Yokohama, Kanagawa-ken; Masao Imai, 11-10, Hashido 1-chome, Seya-ku, Yokohama, Kanagawa-ken, all of Japan

[21] Appl. No.: 833,144

[22] Filed: Feb. 26, 1986

Related U.S. Application Data

[63] Continuation of Ser. No. 659,347, Oct. 10, 1984, abandoned.

[30] Foreign Application Priority Data

Oct. 13, 1983 [JP] Japan ............................. 58-189885

[51] Int. Cl.$^4$ ............................................. G03C 5/16
[52] U.S. Cl. ......................................... 430/270; 430/21; 430/945; 430/916; 430/191; 430/192; 430/196; 430/197; 430/495
[58] Field of Search ................ 430/916, 21, 936, 270, 430/495, 945, 191, 196, 192, 197

[56] References Cited

U.S. PATENT DOCUMENTS

| 4,050,938 | 9/1977 | Smith et al. | 430/581 |
|---|---|---|---|
| 4,171,221 | 10/1979 | DoMinh | 430/495 |
| 4,219,826 | 8/1980 | Bloom et al. | 430/945 |
| 4,328,303 | 5/1982 | Ronn et al. | 430/495 |
| 4,460,665 | 7/1984 | Kunikane et al. | 430/945 |
| 4,465,767 | 8/1984 | Oba et al. | 430/945 |

FOREIGN PATENT DOCUMENTS

| 57-195341 | 12/1982 | Japan | 430/495 |
|---|---|---|---|
| 57-195336 | 12/1982 | Japan | 430/495 |
| 58-2833 | 1/1983 | Japan | 430/495 |
| 58-16888 | 1/1983 | Japan | 430/495 |
| 58-105996 | 6/1983 | Japan | 430/495 |
| 58-105960 | 6/1983 | Japan | 430/495 |

OTHER PUBLICATIONS

Research Disclosure, 21612, Apr. 1, 1982, pp. 117-118.

*Primary Examiner*—Won H. Louie

[57] ABSTRACT

Disclosed herein is an optical recording medium which includes a recording layer composed of (a) an organometallic complex having an absorption maximum in the wavelength range of 600–1200 nm, (b) a resinous binder and (c) a sensitizer capable of generating radicals upon exposure to ultraviolet rays. The recording of information on the recording layer is effected with ease by exposure to ultraviolet rays. The reproduction of recorded information is effected by a laser beam having an oscillatory wavelength in the visible or near infrared wavelength range.

11 Claims, 2 Drawing Figures

OPTICAL RECORDING MEDIUM

This is a continuation of application Ser. No. 659,347 filed Oct. 10, 1984, now abandoned.

BACKGROUND OF THE INVENTION (1) Field of the Invention

This invention relates to an optical recording medium permitting the reproduction of recorded information such as images, voice or sound by laser beam, and more particularly to an optical recording medium permitting the recording of such information by exposure to ultraviolet rays.

(2) Description of the Prior Art

Reflecting recent advancements in laser technology, optical recording making use of laser beams for the recording and reproduction of information has been attracting more and more attention. It is already possible to reproduce information on video disks or audio disks. This optical recording method provides merits that conventional analog recording methods, e.g., phonographic records or conventional magnetic recording methods, are unable to achieve: i.e., the optical recording method permits a large recording density, assures long service life owing to its non-contact reproduction, and features short random access time.

In recording media such as video disks and audio disks, recording pits of 1 μm or smaller are formed by mechanical methods such as injection molding or press forming. These conventional methods are however accompanied by many problems from the standpoint of production engineering, which problems include the need for expensive precision molding machines, limitations in materials as the molding materials and the clogging or loading of pit-transferring stamps.

Researchers of the present assignee company conducted investigations to overcome such problems and to develop an optical recording medium which may be produced with a high production yield by means of a simple apparatus. They have already proposed novel optical recording systems and media as disclosed in Japanese Patent Laid-open Nos. 195336/1982 and 195341/1982.

The above optical recording system and medium permit the reproduction of records by a laser beam having an oscillatory wavelength in the visible or near infrared wavelength range while making use of the fact that, when a desired area of a recording layer containing a compound having an absorption maximum in a specific visible or near infrared wavelength range is exposed to radiation such as ultraviolet rays or electron beams, the optical absrotpion in the visible or near infrared wavelength range is diminished. Accordingly, the above-proposed system and meidum are exceptionally good because they do not require the formation of pits by a mechanical method such as injection molding.

When radiation is used to record in the above-proposed optical recording system, the diminution of optical absorption of wavelengths in the visible to near infrared range is not always sufficient if the radiation has ordinary energy. In other words, the above optical recording system requires radiation, for example, having an intensity as high as at least 500 mJ. Therefore, there has been a standing demand for the development of a recording medium which permits recording with low radiation energy.

SUMMARY OF THE INVENTION

An object of this invention is to provide an optical recording medium which permits ready recording of information at a satisfactory level by low radiation energy or by exposure of the recording medium to radiation for a short period of time.

Another object of this invention is to provide an optical recording medium which permits ready recording of information at a satisfactory level by exposure to ultraviolet rays.

Other objects of this invention will become apparent from the description below.

DETAILED DESCRIPTION OF THE INVENTION

Figure 1:
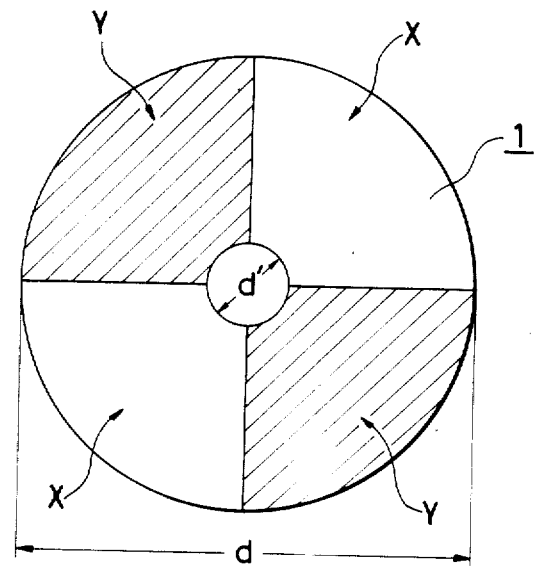
FIG. 1 is a plan view of a photomask 1 which was used in Examples of this invention.

The following optical recording medium has been provided in accordance with this invention:

In an optical recording medium, the improvement wherein said optical recording medium comprises a recording layer composed of:

(a) an organometallic complex having an absorption maximum in the wavelength range of 600–1200 nm;

(b) a resinous binder; and (c) a sensitizer capable of generating radicals upon exposure-to ultraviolet rays, the recording of information on the recording layer is effected upon exposure to ultraviolet rays, and the reproduction of written information is effected by a laser beam having an oscillatory wavelength in the visible or near infrared wavelength range.

As the organometallic complex (a) [hereinafter called "laser beam absorbent"] having an absorption maximum in the wavelength range of 600–1200 nm which is a constituent of the recording layer in the above-described optical recording medium of this invention, it is possible to use any of (i) aromatic diamine type metal complexes, (ii) aromatic dithiol type metal complexes, (iii) aliphatic diamine type metal complexes, (iv) aliphatic dithiol type metal complexes or (v) mercaptophenol type metal complexes.

Details of these compounds are disclosed, for example, in Japanese Patent Laid-open Nos. 2833/1983, 105960/1983, 105996/1983 and 16888/1983 and in Inorganic Chemistry 14, 640–645 (1975).

As the aromatic diamine type metal complexes (i), it is preferred to use compounds represented by the following general formula (I):

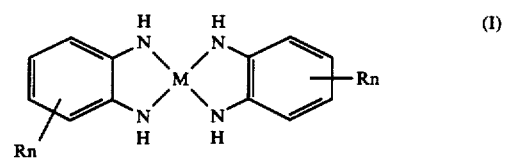

wherein R means a hydrogen or halogen atom or an alkyl or nitro group, n stands for an integer of 1–4, and M denotes a metallic atom such as nickel, cobalt, palladium or platinum. For example, bis(4-chloro-O- phenylenediamino)nickel (absorption maximum $\lambda_{max}$: 800 nm; molar ratio absorption coefficient $\epsilon$: 66600) or bis(4-methyl-O-phenylenediamino)nickel (absorption maximum $\lambda_{max}$: 795 nm; molar ratio absorption coefficient $\epsilon$: 55100) are preferably used.

As preferred aromatic dithiol type metal complexes (ii) may be mentioned organometallic complexes represented by the following general formula (II):

(II)

wherein Z means a hydrogen or halogen atom or an alkyl group, n stands for an integer of 1-4, M denotes a metallic atom such as nickel, cobalt, palladium or platinum and A is a quaternary ammonium group including, for example, bis(1-methyl-3,4-dithiophenolate)nickel-(II) tetra-n-butylammonium ($\lambda_{max}$: 890 nm; $\epsilon$: 16270), bis-(1,2,3,4-tetrachloro-5,6-dithiophenolate)nickel(II) tetra-n-butylammonium ($\lambda_{max}$: 885 nm; $\epsilon$: 15700) or bis(1,2,4-trichloro-5,6-dithiophenolate)nickel(II) tetra-n-butyl ammonium ($\lambda_{max}$: 870 nm; $\epsilon$: 14900).

Preferred aliphatic diamine type metal complexes (iii) may include organometallic complexes represented by the following general formula (III):

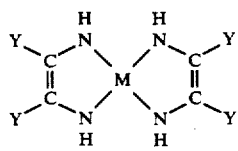
(III)

wherein Y means a hydrogen atom or an alkyl, phenyl or cyano group, and M denotes a metallic atom such as nickel, cobalt, palladium or platinum. Bis(diiminosuccinonitrilo)platinum ($\lambda_{max}$: 640 nm; $\epsilon$: 32000) or bis(diiminosuccinonitrilo)nickel ($\lambda_{max}$: 700 nm; $\epsilon\epsilon$: 23500) may, for example, be used.

As the aliphatic dithiol type metal complexes (iv), it is preferred to use organometallic complexes represented by the following general formula (IV):

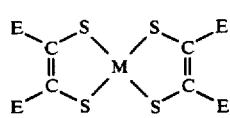
(IV)

wherein E means a hydrogen atom or an alkyl or phenyl group, and M denotes a metallic atom such as nickel, cobalt, palladium or platinum. Bis[cis-1,2-bis(p-methoxyphenyl)ethylene-1,2-dithiolate]nickel ($\lambda_{max}$: 920 nm; $\epsilon$: 35000) or bis(cis-1,2-bisphenylethylene-1,2-dithiolate)platinum ($\lambda_{max}$: 800; $\epsilon$: 51600) may, for example, be used.

Preferred mercaptophenol type organometallic complexes (v) may include organometallic complexes represented by the following general formula (V) or (VI):

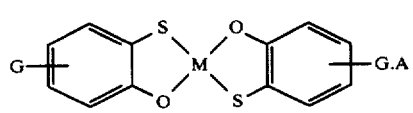
(V)

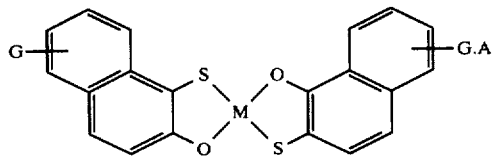
(VI)

wherein G means a hydrogen or halogen atom or an alkyl group, M denotes a metallic atom such as nickel, cobalt, palladium or platinum, and A is a quaternary ammonium group. Bis(1-mercapto-2-naphtholate)nickel(II) tetra-n-butylammonium ($\lambda_{max}$: 1100 nm; $\epsilon$: 12290) or bis(1-mercapto-2-phenolate)nickel(II) tetra-n-butylammonium ($\lambda_{max}$: 1025 nm; $\epsilon$: 12700) may, for example, be employed.

The above-described laser beam absorbents can diminish the absorption characteristics of laser beams to certain extents upon exposure to radiations such as ultraviolet rays, electron beams, ion beams or X-rays. However, the resulting diminution is not sufficient for reproducing records.

On the other hand, the absorption characteristic of a laser beam can show remarkable diminution in the presence of a sensitizer (c) capable of generating radicals upon exposure to ultraviolet rays as in the present invention, thereby permitting recording with high sensitivity in a short period of time.

The resinous binder (b) useful in the practice of this invention is a binder required to form, on a substrate, a coated recording layer containing the laser beam absorbent (a) and sensitizer (c) dispersed uniformly therein. As such a binder may, for example, be mentioned an acrylic or methacrylic resin which is a homopolymer or copolymer of an acrylate or methacrylate; a homopolymer or copolymer of an aromatic vinyl monomer such as styrene or α-methylstyrene; a nomopolymer or copolymer of an aliphatic vinyl ester such as vinyl acetate or vinyl propionate; a homopolymer or copolymer of a halogenated vinyl monomer such as vinyl chloride or vinylidene chloride; a condensation resin such as polycarbonate resin, polyethersulfon resin, epoxy resin, phenoxy resin, polyester resin or polyurethane resin; or a cellulose derivative such as nitrocellulose, acetyl cellulose, cellulose acetate butyrate, cellulose butyrate or cellulose propionate. Needless to say, the resinous binder (b) should not necessarily be limited to the above-exemplified resins and any resins may be used as the resinous binder (b) as long as they can disperse the above-described laser beam absorbent and sensitizer uniformly and can form a coated recording layer on a substrate. The molecular weight of the resinous binder (b) may preferably be at least 2,000 with the range of from 5,000 to 500,000 being particularly preferred. It is desirable that the resinous binder (b) be soluble in organic solvents. The term "molecular weight", as used herein, means a molecular weight defined in terms of the number average molecular weight as polystyrene by gel permeation chromatography.

The sensitizer (c), which is useful in the practice of this invention and generates radicals upon exposure to ultraviolet rays, is a material which gives off photoradicals when exposed to ultraviolet rays (which may be either near-ultraviolet rays of 300–400 nm or a far-ultraviolet rays of 300 nm or shorter.). As exemplary sensitizers may be mentioned benzophenone type sensitizers such as benzophenone, p-methylbenzophenone, p-t-butylbenzophenone, methyl O-benzoylbenzoate, O-benzoylbenzoic acid, 4,4'-bisdimethylaminobenzophenone, 4,4'-bisdiethylaminobenzophenone and 4-dichloroacetylbenzophenone; acetophenone type sensitizers such as acetophenone, 2,2-diethoxyacetophenone and p-tert-butyltrichloroacetophenone; propiophenone type sensitizers such as 2-hydroxy-2-methylpropiophenone and 4'-isopropyl-2-hydroxy-2-methylpropiophenone; benzoin type sensitizers such as benozin, benzoin methyl ether, benzoin ethyl ether, benzoin isopropyl ether and benzoin isobutyl ether; anthraquinone type sensitizers such as anthraquinone, methyl anthraquinone and ethyl anthraquinone; benzil type sensitizers such as benzil, benzil dimethyl ketal and benzil diethyl ketal; thioxantioxanthone type sensitizers such as thioxanthone, 2-chlorothioxanthone, 2-methylthioxanthone, 4-isopropylxanthone and 2 acetylthioxanthone; benzoate type sensitizers such as ethyl 4-dimethylaminobenzoate, ethyl 2-dimethylaminobenzoate and 2-(n-butoxy)ethyl 4-dimethylaminobenzoate; azonitrile type sensitizers such as azobisisobutyronitrile ahd azobisvaleronitrile; or azide type sensitizers such as benzyl azide, orthonaphthoquinone diazide, polyvinylbenzyl azide and polyvinylbenzylsulfonyl azide. These sensitizers may be used either singly or in combination.

The recording layer in an optical recording medium according to this invention is composed of (a) an organometallic complex (laser beam absorbent), (b) a resinous binder and (c) a radical-generating sensitizer as described above.

When the recording layer is exposed to the radiation of an information-recording ultraviolet ray, photoradicals are given off by radiation from the sensitizer (c). The photoradicals are then believed to act on the structure of the metallic complex of the laser beam absorbent (a), resulting in remarkable diminution of the light absorption characteristics for wavelengths in the range of from 600–1200 nm.

The components (a), (b) and (c) of the recording layer may be added generally in proportions of 1–50 wt. %, 30–98 wt. % and 1–20 wt. %, or preferably 2–20 wt. %, 70–96 wt. % and 2–10 wt. %, respectively. The proportions of these components (a), (b) and (c) may be suitably chosen by taking the sensitivity and physical strength (for example, resistance to scratches and ease of adhesion to substrates) of the recording layer into consideration.

If the component (a) is contained in any amount less than 1 wt. %, the contrast between the recorded area and the non-recorded area will be insufficient and the reproduction will be affected by noise. Any amount of the component (a) greater than 50 wt. % will lead to a deterioration in the physical strength of the recording layer or will render the uniform dispersion of the component (a) in the recording layer difficult. Any amount of the component (c) smaller than 1 wt. % will not provide sufficient recording sensitivity upon recording information in the resultant recording layer. If the amount of the component (c) should exceed 20 wt. %, the physical strength of the recording layer will be lowered.

In the present invention, each recording layer is composed principally of the above-mentioned three components (a), (b) and (c). In some instances, a polyvinyl compound may also be used in combination with the three components (a), (b) and (c). Combined use of such a polyvinyl compound is advantageous in that the absorbing capacity for wavelengths in the range of from 600 nm to 1200 nm is further diminished, because concurrently with the diminution of light-absorbing capacity owing to the direct attack of photoradicals, given off from the sensitizer (c) upon exposure to ultraviolet rays, on the laser beam absorbent (a), it is also believed that such radicals attack the polyvinyl compound to generate radicals and these radicals, originated from the polyvinyl compound, then undergo chain reaction to attack the laser beam absorbent (a) as well. In other words, the presence of a polyvinyl compound can significantly improve the efficiency of utilization of generated photoradicals.

As such polyvinyl compounds may, for example, be mentioned esters between polyols and unsaturated carboxylic acids such as acrylic acid, methacrylic acid, itaconic acid, fumaric acid and maleic acid; addition products between epoxy resins and unsaturated carboxylic acids; addition products between polyisocyanate compounds and hydroxyl-containing vinyl monomers; polyallyl compounds; polybutadiene; and polyisoprene. It is preferable that the above-described polyvinyl compounds be non-volatile at room temperature, and desirably have boiling points of 300° C. and higher. The polyvinyl compound may generally be added in an amount of 0–30 wt. % on the basis of the whole solids in the recording layer, with 5–20 wt. % being suitable. It is however preferred to adjust the amount in accordance with the type of each polyvinyl compound to be added so that the resulting recording layer does not become sticky at room temperature.

The function of the above-mentioned polyvinyl compound may also be exhibited per se by the resinous binder (b), provided that at least part of the resinous binder is formed of the polyvinyl compound. This may be achieved by introducing unsaturated groups (i.e., vinyl groups) into a resinous binder having an average molecular weight of 2,000 or higher, or preferably in the range of from 5,000 to 500,000. As a method for introducing such unsaturated groups into the resinous binder (b) may, for example, be mentioned to use an unsaturated polybasic acid as a raw material for polyester resin or polyurethane resin; to copolymerize an unsaturated carboxylic acid as a component for various vinyl polymers and then to cause a glycidyl functional monomer or isocyanate functional monomer to react with pendant carboxyl groups of the resultant polymer; to copolymerize a hydroxyl functional monomer as a component for various vinyl polymers and then to cause an unsaturated carboxylic anhydride or isocyanate functional monomer to react with pendant hydroxyl groups of the resultant polymer; to induce a similar reaction at hydroxyl groups contained in various cellulose derivatives; or to copolymerize a glycidyl functional monomer as a component for various vinyl polymers and then to cause an unsaturated carboxylic acid to react with pendant glycidyl groups of the resultant polymer.

The recording layer of the optical recording medium of this invention may be formed in the following manner: The above-mentioned components (a), (b) and (c) and, if necessary, the polyvinyl compound are dispersed or dissolved in an organic solvent (or a mixed solvent) which can desirably dissolve all of these components. The resulting coating formulation is then applied to a substrate such as a light-transmitting resin sheet (e.g., PMMA sheet), a glass sheet, a mirror-finished metal sheet or plastic sheet metallized by the vacuum deposition or sputtering technique. Thereafter, the organic solvent is caused to evaporate off so that the thus-coated layer is dried into a coated recording layer. The thickness of the recording layer is usually 0.1–10 μm and preferably 0.2–2.0 μm from the viewpoint of recording density and resolving power.

As such a substrate may, for example, be mentioned a sheet or film made of a transparent plastic material such as a methacrylic resin such as poly(methyl methacrylate), a methacrylate copolymer, a polycarbonate resin, a vinyl chloride resin, a polystyrene-base copolymer resin, a polyester resin, an acrylonitrile-styrene copolymer resin or a cellulose acetate resin; a transparent substrate such as glass sheet or plate; a metal sheet having a mirror-finished surface; or a plastic or glass sheet bearing a metal film vacuum-deposited or sputtered thereon. Use of a transparent substrate is however preferred from the viewpoint of durability upon application of the resultant recording medium over a long period of time because the reproduction operation can be effected by directing a laser beam from the side opposite to the layer containing the recorded material.

Information is recorded on the recording medium of this invention, which carries a recording layer obtained in the above manner, by exposing it to ultraviolet rays. In other words, signals can be recorded since absorption of wavelengths in the range of from 600–1,200 nm, which corresponds to the oscillatory wavelengths of the reading laser beam at a area subjected to exposure by the ultraviolet ray, is diminished significantly compared with the unexposed area. Any light source may be employed as a light source for recording ultraviolet rays as long as its luminous spectra fall below 400 nm, or preferably within the range of 200–400 nm. As such a light source may, for example, be employed a mercury lamp, sodium lamp, cesium lamp, cadmium lamp, metal halide lamp, helium lamp, neon lamp, argon lamp, crypton lamp, xenone lamp, xenone-mercury arc lamp, argon laser, helium-cadmium laser, pigment laser or excimer laser. It is also possible to narrow a laser beam having an oscillatory wavelength in the ultraviolet range into a spot beam, thereby scanning the recording layer to record signals in the recording layer. When replicating the same information at once by means of a recording medium according to this invention, the recording of signals may be effected by exposing the recording medium to ultraviolet rays through a photomask, which corresponds to the signals to be recorded, by the contact or projection exposure technique so as to diminish the absorption of wavelengths in the range of 600–1,200 nm at the exposed area compared with the unexposed area as mentioned above.

As has been described above, signals may be reproduced from the optical recording medium of this invention, which has been subjected to the recording of the signals, by means of a laser beam having an oscillatory wavelength in the visible or near-infrared wavelength range. In other words, the signals can be reproduced by directing a laser beam having an oscillatory wavelength corresponding to the absorption spectrum of the laser beam absorbent (a) which is a constituent of the optical recording medium, for example, a spot beam such as a semiconductor laser, helium-neon laser or YAG laser onto the recording layer, and then detecting variations in transmittance or reflectivity. The thus reproduced signals are then modulated to reproduce images, voice or sound.

It is also feasible to apply a metal film over the recording layer in accordance with the vacuum deposition or sputtering technique after the recording of information by exposure to ultraviolet rays so that a reflecting layer is formed. This reflecting layer enables the thus-recorded information to be read out from the side of the transparent substrate by using reflected light. It is also feasible to apply a primer of a vacuum-deposited metal film over the recording layer or to deposit a metal in vacuo as a protective coating layer over the recording layer. In addition, two sheets of optical recording media may be put together for use as a double-sided disc.

Certain embodiments of this invention will hereinafter be described specifically by the following Examples:

EXAMPLE 1

In a mixed organic solvent consisting of 100 parts by weight of dimethyl-formamide, 100 parts by weight of ethylene glycol monoethyl ether and 100 parts by weight of methyl ethyl ketone, were dissolved 10 parts of bis(1,2,3,4-tetrachloro-5,6-dithiophenolate)nickel(II) tetra-n-butylammonium ($\lambda_{max}$: 885 nm; $\epsilon$: 15,700), 85 parts by weight of poly(methyl methacrylate) (molecular weight: 15,000) and 5 parts by weight of benzophenone. The resulting solution was coated on a methacrylic resin plate 12 mm thick, i.e., a substrate, to a dry film thickness of 1 μm by a spin coater. The thus-coated plate was dried at 80° C. for 10 minutes to drive off the solvent, thereby providing an optical recording medium of this invention.

Figure 2:
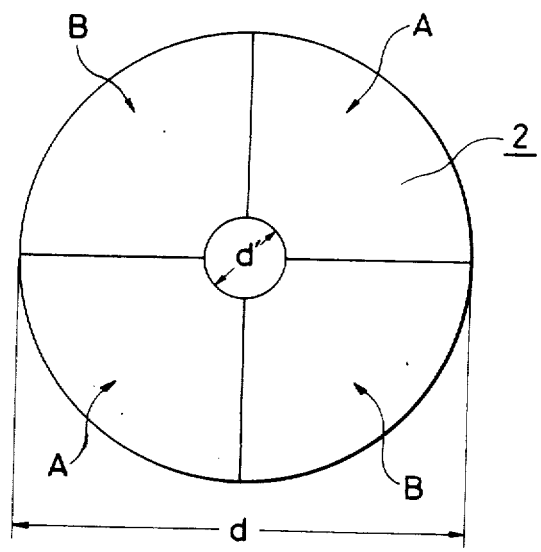
FIG. 2 is a plan view of an optical recording medium obtained in the Examples of this invention.

Then, a photomask 1 which was made of silica glass and was in the form of a phonographic record (inner diameter d': 20 mm; outer diameter d: 120 mm) as depicted in FIG. 1, in which X indicates light-transmitting areas over which no chromium has been vacuum-deposited and Y indicates light-shielding areas over which chromium has been vacuum-deposited, was brought into a contiguous relation with the recording layer of the optical recording medium 2 of this invention which had been formed into the same shape as the photomask 1. The thus superposed photomask 1 and optical recording medium 2 were then exposed at a rate of 300 mJ/cm$^2$ under a 2-KW high-pressure mercury lamp. Using a semiconductor laser (oscillatory wavelength: 830 nm), the absorption coefficients of exposed area A and unexposed area B of the recording layer obtained in the form depicted in FIG. 2 were measured. The ratio of the former absorption coefficient to the latter absorption coefficient was found to be 1:4. It was thus confirmed that a sufficient degree of sensitivity was obtained as an optical recording medium.

EXAMPLE 2

Five parts by weight of bis(4-methyl-O-phenylenediamino)nickel ($\lambda_{max}$: 795 nm; $\epsilon$: 55,100), 90 parts by weight of cellulose acetate butyrate resin (molecular weight: 8,000) and 5 parts by weight of benzoin ethyl ether were dissolved in a mixed solvent which consisted of 200 parts by weight of dimethylformamide, 100 parts by weight of ethyl acetate and 100 parts by weight of methyl ethyl ketone. The resulting solution was coated on a methacrylic resin plate in the same manner as in Example 1, followed by drying to provide an optical recording medium of this invention. The optical recording medium was exposed to ultraviolet rays under exactly the same conditions as those employed in Example 1. The ratio of the absorption coefficient of the exposed area to that of the unexposed area was found to be 1:3 when measured using a semiconductor laser (oscillatory wavelength: 830 nm). Thus the sensitivity of the resulting product was found to be sufficient as an optical recording medium.

EXAMPLE 3

Five parts by weight of bis(diiminosuccinonitrilo)platinum ($\lambda_{max}$: 640 nm; $\epsilon$: 32,000), 92 parts by weight of phenoxy resin (molecular weight: 13,000) and 3 parts by weight of benzyl dimethyl ketal were dissolved in a mixed solvent consisting of 100 parts by weight of ethylene glycol monomethyl ether, 100 parts by weight of methyl ethyl ketone and 100 parts by weight of dimethylacetamide. Following the procedures of Example 1, the resulting solution was coated on a methacrylic resin plate, followed by drying to obtain an optical recording medium of this invention. It was exposed to ultraviolet rays under exactly the same conditions as those employed in Example 1. The ratio of the absorption coefficient of the exposed area to that of the unexposed area was found to be 1:3 when measured using a helium-neon laser (oscillatory wavelength: 633 nm). Thus the sensitivity of the resulting product was found to be sufficient as an optical recording medium.

EXAMPLE 4

Dissolved in a mixed solvent consisting of 100 parts by weight of acetone, 100 parts by weight of ethylene glycol monoethyl ether and 100 parts by weight of cyclohexanone were 3 parts by weight of bis(cis-1,2-bisphenylethylene 1,2-dithiolate)platinum ($\lambda_{max}$: 800 nm; $\epsilon$: 51,600), 92 parts by weight of a styrene-ethyl acrylate copolymer resin (molecular weight: 8,000) and 5 parts by weight of ethylanthraquinone. Following the procedures of Example 1, the thus prepared solution was coated on a methacrylic resin plate, followed by drying to obtain a recording medium of this invention. The recording medium was exposed to ultraviolet rays under exactly the same conditions as those employed in Example 1. The ratio of the absorption coefficient of the exposed area to that of the unexposed area was found to be 1:4.5 when measured using a semiconductor laser (oscillatory wavelength: 830 nm). Thus the sensitivity of the resulting product was found to be sufficient as an optical recording medium.

EXAMPLE 5

In a mixed solvent of 200 parts by weight of dimethylformamide, 100 parts by weight of methyl ethyl ketone and 100 parts by weight of dichloromethane, were dissolved 10 parts by weight of bis(1-mercapto2-phenolate)nickel(II) tetra-n-butylammonium ($\lambda_{max}$: 1,025 nm; $\epsilon$: 12,700), 85 parts by weight of poly(methyl methacrylate) (molecular weight: 15,000) and 5 parts by weight of Michler's ketone. Similar to Example 1, the resulting solution was coated on a methacrylic resin plate, followed by drying to prepare an optical recording medium of this invention.

Under exactly the same conditions as those used in Example 1, the optical recording medium was exposed to ultraviolet rays. The ratio of the absorption coefficient of the exposed area to that of the unexposed area was found to be 1:2.5 when measured using a spectrophotometer at a near-infrared ray of 1060 nm which was the oscillatory wavelength of a YAG laser. Thus the sensitivity of the resulting product was found to be sufficient as an optical recording medium.

EXAMPLE 6

An optical recording medium of this invention was prepared in the same manner as in Example 1 except that 20 parts by weight of the 85 parts of poly(methyl methacrylate) was replaced by trimethylolpropane triacrylate which has been obtained by the esterification between trimethylol propane as a polyol and acrylic acid as an unsaturated carboxylic acid. The ratio of the absorption coefficient of the exposed area to that of the unexposed area was found to be 1:5. Thus the sensitivity of the resulting product was found to be sufficient as an optical recording medium and was enhanced compared with the sensitivity of 1:4 achieved in Example 1.

EXAMPLE 7

An optical recording medium of this invention was prepared in the same manner as in Example 2 except that 15 parts by weight of the 90 parts by weight of cellulose acetate butyrate was replaced by tetraethylene glycol dimethacrylate which had been obtained by the esterification between tetraethylene glycol as a polyol and methacrylic acid as an unsaturated carboxylic acid. As a result of a similar evaluation, the ratio of the absorption coefficient of the exposed area to that of the unexposed area was found to be 1:5. Thus the sensitivity of the resulting product was found to be sufficient as an optical recording medium and was enhanced compared with the sensitivity of 1:3 achieved in Example 2.

EXAMPLE 8

An optical recording medium of this invention was prepared in the same manner as in Example 3 except that 20 parts by weight of the 92 parts by weight of phenoxy resin was replaced by an epoxy-type polyvinyl compound which was a reaction product between bisphenol A diglycidyl ether and methacrylic acid.

As a result of a similar evaluation, the ratio of the absorption coefficient of the exposed area to that of the unexposed area was found to be 1:4. Thus the sensitivity of the resulting product was found to be sufficient as an optical recording medium and was enhanced compared with the sensitivity of 1:3 achieved in Example 3.

EXAMPLE 9

An optical recording medium of this invention was prepared in the same manner as in Example 4 except that 12 parts by weight of the 92 parts by weight of styrene-ethyl acrylate copolymer resin was replaced by triallyl isocyanurate, a polyallyl compound. As a result of a similar evaluation, the ratio of the absorption coefficient of the exposed area to that of the unexposed area was found to be 1:6. Thus the sensitivity of the resulting product was found to be sufficient as an optical recording medium and was enhanced compared with the sensitivity of 1:4.5 achieved in Example 4.

EXAMPLE 10

An optical recording medium of this invention was prepared in the same manner as in Example 5 except that a vinyl group containing copolymer (average molecular weight: 8,300; content of vinyl group: 1.5 equivalents/1,000 gram), which had been obtained by an addition reaction between acrylic acid and glycidyl group of a copolymer consisting of 60 wt. % of methyl methacrylate and 40 wt. % of glycidyl methacrylate, was used in lieu of the poly(methyl methacrylate). As a result of a similar evaluation, the ratio of the absorption coefficient of the exposed area to that of the unexposed area was found to be 1:4. Thus the sensitivity of the resulting product was found to be sufficient as an optical recording medium and was enhanced compared with the sensitivity of 1:2.5 achieved in Example 5.

COMPARATIVE EXAMPLE 1

An optical recording medium was prepared for the sake of comparison in exactly the same manner as in Example 1 except that the benzophenone was excluded. As a result of a similar evaluation to that effected in Example 1, the ratio of the absorption coefficient of the exposed area to that of the unexposed area was found to be 1:1.3. Thus the sensitivity of the resulting product was found to be insufficient as an optical recording medium.

COMPARATIVE EXAMPLE 2

An optical recording medium was prepared for the sake of comparison in exactly the same manner as in Example 2 except that the benzoin ethyl ether was excluded. As a result of a similar evaluation to that effected in Example 2, the ratio of the absorption coefficient of the exposed area to that of the unexposed area was found to be 1:1.4. Thus the sensitivity of the resulting product was found to be insufficient as an optical recording medium.

COMPARATIVE EXAMPLE 3

An optical recording medium was prepared for the sake of comparison in exactly the same manner as in Example 3 except that the benzyl dimethyl ketal was excluded. As a result of a similar evaluation to that effected in Example 3, the ratio of the absorption coefficient of the exposed area to that of the unexposed area was found to be 1:1.6. Thus the sensitivity of the resulting product was found to be insufficient as an optical recording medium.

COMPARATIVE EXAMPLE 4

An optical recording medium was prepared for the sake of comparison in exactly the same manner as in Example 4 except that the ethylanthraquinone was excluded. As a result of a similar evaluation to that effected in Example 4, the ratio of the absorption coefficient of the exposed area to that of the unexposed area was found to be 1:1.25. Thus the sensitivity of the resulting product was found to be insufficient as an optical recording medium.

COMPARATIVE EXAMPLE 5

An optical recording medium was prepared for the sake of comparison in exactly the same manner as in Example 5 except that the Michler's ketone was excluded As a result of a similar evaluation to that effected in Example 5, the ratio of the absorption coefficient of the exposed area to that of the unexposed area was found to be 1:1.25. Thus the sensitivity of the resulting product was found to be insufficient as an optical recording medium.

What is claimed is:

1. A method of optically recording information which comprises providing an optical recording medium having a recording layer composed of:
   (a) an organometallic complex having an absorption maximum in the wavelength range of 600–1200 nm and being selected from the group consisting of:
   (i) aromatic diamine metal complexes of the formula

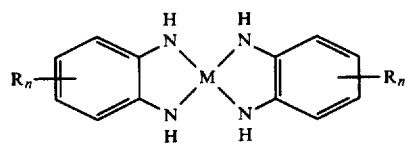

wherein R is a hydrogen or a halogen atom or an alkyl or nitro group, n is an integer of 1 to 4 and M is a nickel, palladium or platinum atom;

(ii) aromatic dithiol metal complexes of the formula

wherein Z is a hydrogen or a halogen atom or an alkyl group, n is an integer of 1 to 4, M is a nickel, palladium or platinum atom and A is a quaternary ammonium group;

(iii) aliphatic diamine metal complexes of the formula

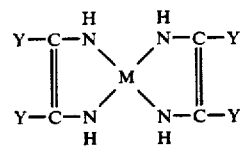

wherein Y is a hydrogen atom or an alkyl or phenyl group and M is a nickel, palladium or platinum atom;

(iv) aliphatic dithiol metal complexes of the formula

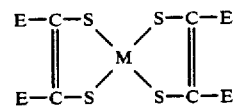

wherein E is a hydrogen atom or an alkyl or phenyl group and M is a nickel, palladium or platinum atom; and (v) mercaptophenol metal complexes of the formulas

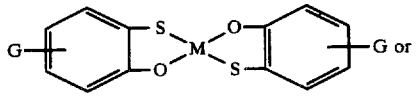

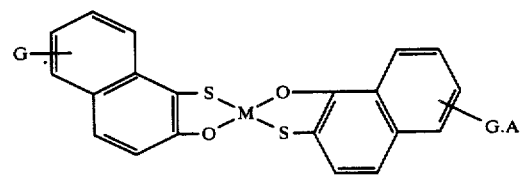

wherein G is a hydrogen or a halogen atom or an alkyl group, M is a nickel, palladium or platinum atom and A is a quaternary ammonium group;
(b) a resinous binder; and
(c) a sensitizer capable of generating radicals upon exposure to an ultraviolet ray, and exposing said recording layer to an ultraviolet ray in the wavelength range of 200–400 nm to diminish the absorption of said metal complexes in the wavelength range of 600–1200 nm at the exposed portion of said layer compared with the unexposed portion thereof, thereby recording information on said recording layer in a substantially pitless form.

2. A method as claimed in claim 1, wherein said information is recorded by scanning with an ultraviolet ray.

3. A method as claimed in claim 1, wherein said information is recorded by the radiation of an ultraviolet ray through a photomask.

4. A method as claimed in claim 1, wherein said recording layer contains a polyvinyl compound.

5. A method as claimed in claim 1, wherein said recording layer contains said organometallic complex in an amount of from 1 to 50 weight percent based on the weight of the (a), (b) and (c).

6. A method as claimed in claim 1, wherein said resinous binder has a molecular weight of at least 2000.

7. A method as claimed in claim 6, wherein said resinous binder is selected from the group consisting of acrylic resins, methacrylic resins, aromatic vinyl resins, aliphatic vinyl ester resins, halogenated vinyl resins, condensation resins and cellulose derivatives, said resinous binder being present in an amount of from 30 to 98 weight percent, based on the weight of the (a), (b) and (c).

8. A method as claimed in claim 7, wherein said resinous binder contains a polyvinyl compound.

9. A method as claimed in claim 4, wherein said polyvinyl compound is present in the amount of up to 30 weight percent, based on the whole solids of the recording layer.

10. A method as claimed in claim 8, wherein said polyvinyl compound is present in the amount of up to 30 weight percent, based on the whole solids of the recording layer.

11. A method as claimed in claim 1, wherein said sensitizer is selected from the group consisting of benzophenones, acetophenones, propiophenones, benzoins, anthraquinones, benzyls, thioxanthones, benzoates, azonitriles, and azido sensitizers, said sensitizer being in the amount of from 1 to 20 weight percent, based on the weight of said recording layer.

* * * * *

UNITED STATES PATENT AND TRADEMARK OFFICE
CERTIFICATE OF CORRECTION

PATENT NO. : 4,707,430
DATED : November 17, 1987
INVENTOR(S) : Ozawa et al

It is certified that error appears in the above-identified patent and that said Letters Patent is hereby corrected as shown below:

On the title page Insert

--(73) Assignee: Mitsui Toatsu Chemicals, Incorporated Tokyo, Japan --.

Signed and Sealed this

Seventh Day of June, 1988

Attest:

DONALD J. QUIGG

*Attesting Officer*  *Commissioner of Patents and Trademarks*